(No Model.)
S. L. ALLEN.
PULVERIZER AND LEVELER.
No. 493,958. Patented Mar. 21, 1893.
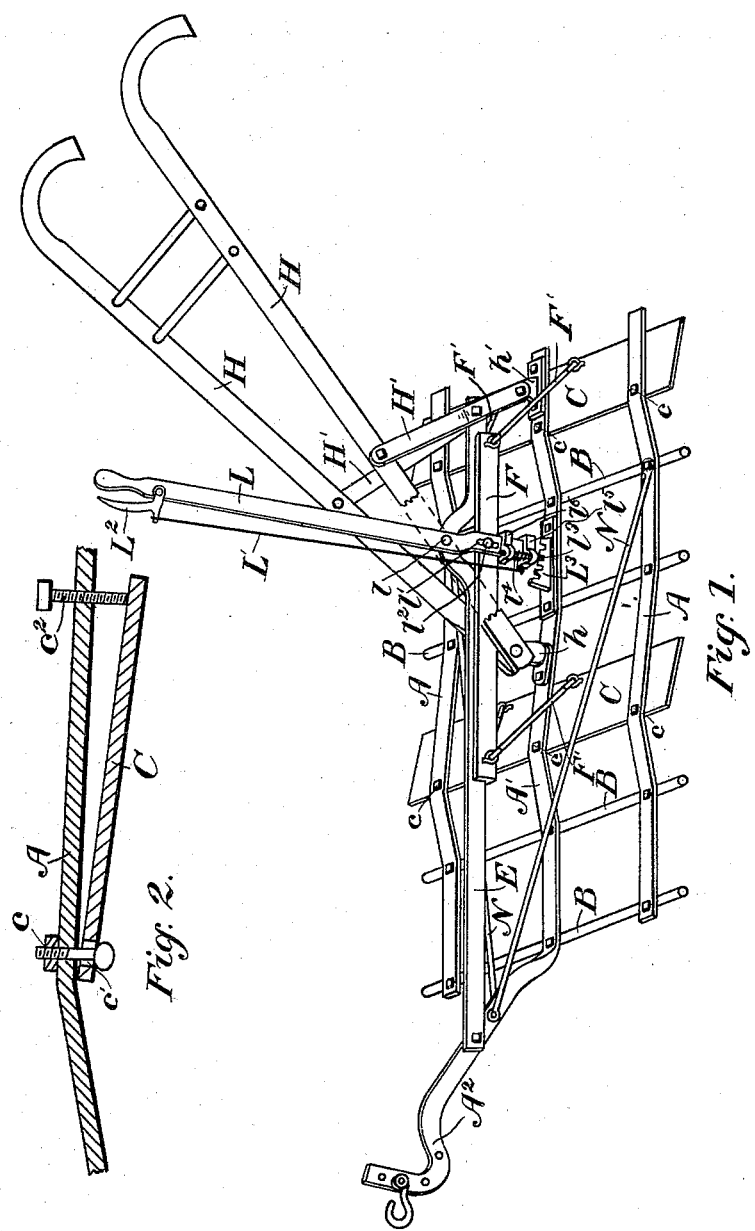
Witnesses
Albert E. Leach
E. W. Gilman
Inventor
Samuel L. Allen
by Wm. B. H. Dows
atty

UNITED STATES PATENT OFFICE.

SAMUEL L. ALLEN, OF CINNAMINSON, NEW JERSEY.

PULVERIZER AND LEVELER.

SPECIFICATION forming part of Letters Patent No. 493,958, dated March 21, 1893.

Application filed January 14, 1891. Serial No. 377,693. (No model.)

*To all whom it may concern:*

Be it known that I, SAMUEL L. ALLEN, a citizen of the United States, residing at Cinnaminson, in the county of Burlington and State of New Jersey, have invented a certain new and Improved Pulverizer and Leveler, of which the following is a full specification.

My invention consists of an improved pulverizer and leveler composed of a frame having cross bars which rest directly upon and are movable along the surface of the ground, the frame being suitably provided with handles and a draw bar as hereinafter described.

Of the accompanying drawings Figure 1 shows my improved implement in perspective, and Fig. 2 is a detail view showing one manner of fastening the adjustable hinged plate to the frame and of adjusting the same.

The frame of my improved implement consists of a number of transverse bars B bolted to longitudinal bars A A' and adapted to rest directly upon the ground. These bars B may be circular, oval or rectangular in cross section as desired. Of the longitudinal bars, A A are the outer and A' the central bar, the said central bar being preferably extended into the forwardly projecting draw bar $A^2$, which is provided with a hook or clevis whereby the implement is dragged along the ground.

N N are strengthening bars bolted to the draw bar $A^2$ and to the outer longitudinal bars A, thereby rendering the frame firm and rigid.

The handles H H are connected to the central bar A' as at $h$, being supported in the usual manner by the bars H' also connected as at $h'$ with the central bar A'.

C C are hinged plates pivotally connected along an edge with the bottom of the frame and capable of angular adjustment up and down with respect to the frame.

I have shown in Fig. 2 one method of hinging the plates C to the frame. Each longitudinal bar A A' is provided with a hole which the bolt $c$ fits while the plate C is provided with elongated holes or slots $c'$ through which, and the holes in the bars, the bolts $c$ are passed up from beneath with their heads on the under surface of the plate C and their nuts on the top surface of the bars A A'. The elongated holes or slots $c'$ are so arranged that the plate C has a hinged motion on the bolts $c$ and is capable of being moved up and down. This up and down motion may be governed in various ways. The bars A A' may each be provided with a screw bolt $c^2$ (see Fig. 2) against which the top of the hinged plate C bears the position of the plate C being varied by screwing in or out the bolts $c^2$. I prefer, however, to provide means for varying the position of the plates C through the agency of a hand lever in some such way as that shown in Fig. 1.

The two plates C are pivotally connected or hinged near their forward edges with the bottom of the frame while at the rear they are jointed to rods or links F' which are in turn pivotally connected to the piece F which is guided to slide back and forth on the bar E. This bar E is bolted at its forward end to the draw bar and at the rear between the supports H H'.

L is the hand lever pivoted at $l$ to an upward bend or loop in the bar E or to any stationary support. The lever L is provided with the slot $l'$ in which plays the pin $l^2$ on the sliding piece F. The lever L is also provided with the handle $L^2$ which by means of the rod or wire L' connects with the piece $l^5$ adapted to slide up and down on the lever L.

$l^3$ is a stop fixed in the piece $l^5$ and adapted to engage with the teeth of the curved segmental piece $L^3$, $l^6$ being a lug on the lever L through which the upper end of the stop plays, the spring $l^4$ being seated around said stop between the stationary lug $l^6$ and the movable piece $l^5$, the construction and arrangement being such that as the lever L is moved back and forth on its pivot $l$ the sliding piece F moves back and forth along the bar E, the stop $l^3$, of course, being lifted from engagement with the toothed segment $L^3$ by pressing inward the handle $L^2$.

The angular position of the plates C varies with the movement of the sliding piece F said plates being connected therewith by the links F'. The depth at which the plates C press into the surface of the ground thus depends on the particular tooth of the segmental piece $L^3$ with which the stop $l^3$ engages.

I claim—

1. A pulverizer and leveler consisting of a rigid frame provided with draw bar and guiding handles, said frame having longitudinal bars A and transverse bars B firmly bolted to the under sides thereof, in combination with thin plates C hinged to said longitudinal bars and means whereby said plates may be firmly set at any desired angle with the longitudinal bars, both the bars B and the plates C being adapted to engage directly with and work in the ground, substantially as described.

2. A pulverizer and leveler consisting of a rigid frame having thin metal plates pivoted thereto in combination with a hand lever, a suitably guided sliding piece operated by said lever and links connecting said sliding piece and plates whereby said plates may be rigidly set at any desired angle with the frame depending on the position of said lever, substantially as described.

In witness whereof I have hereunto set my hand.

SAMUEL L. ALLEN.

Witnesses:
WILLIAM H. ROBERTS,
EDWARD W. BURT.